March 2, 1965     R. A. SCHULTZ     3,171,611
CABLE REEL
Original Filed Sept. 1, 1959     4 Sheets-Sheet 1
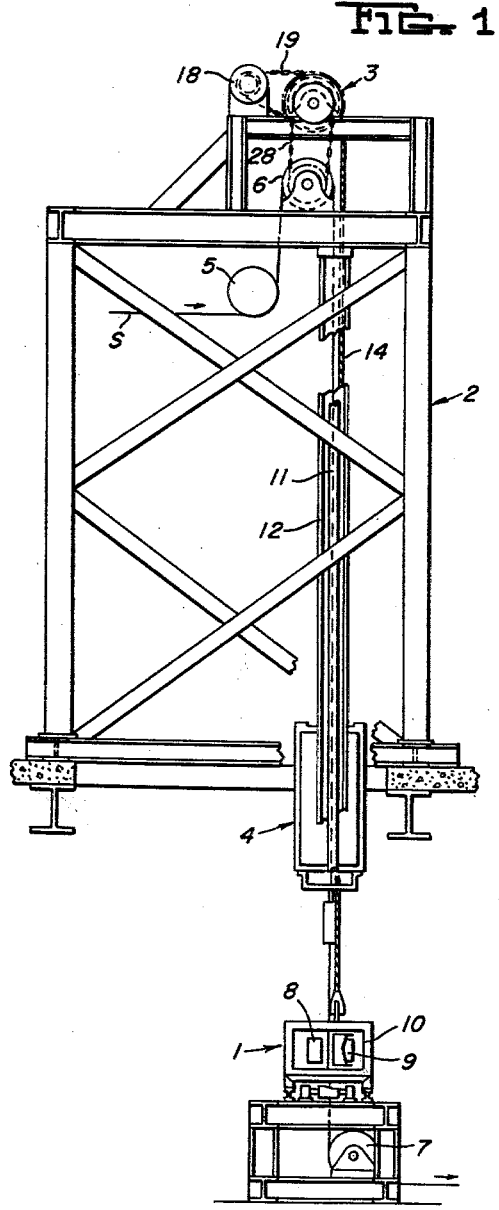
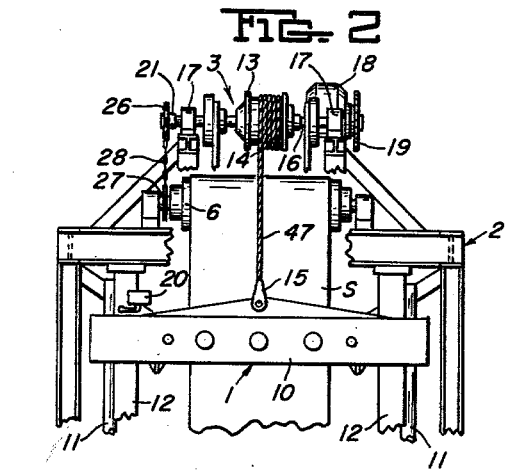
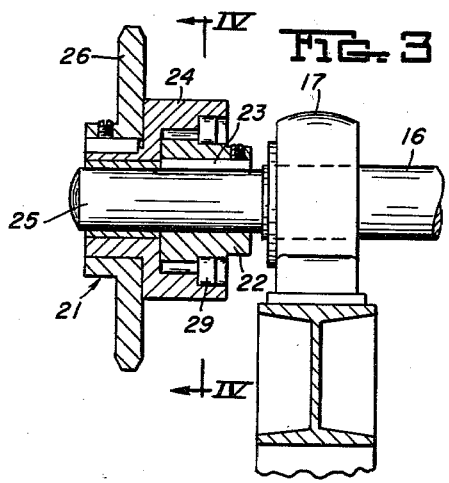
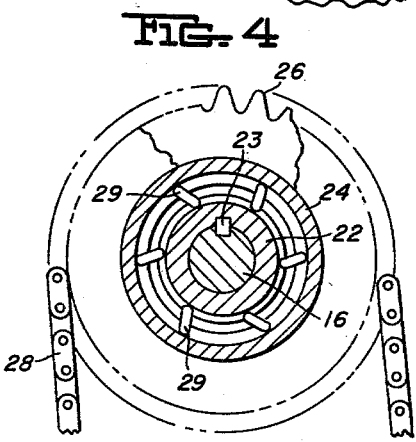
INVENTOR
ROBERT A. SCHULTZ
By Donald G. Dalton
Attorney

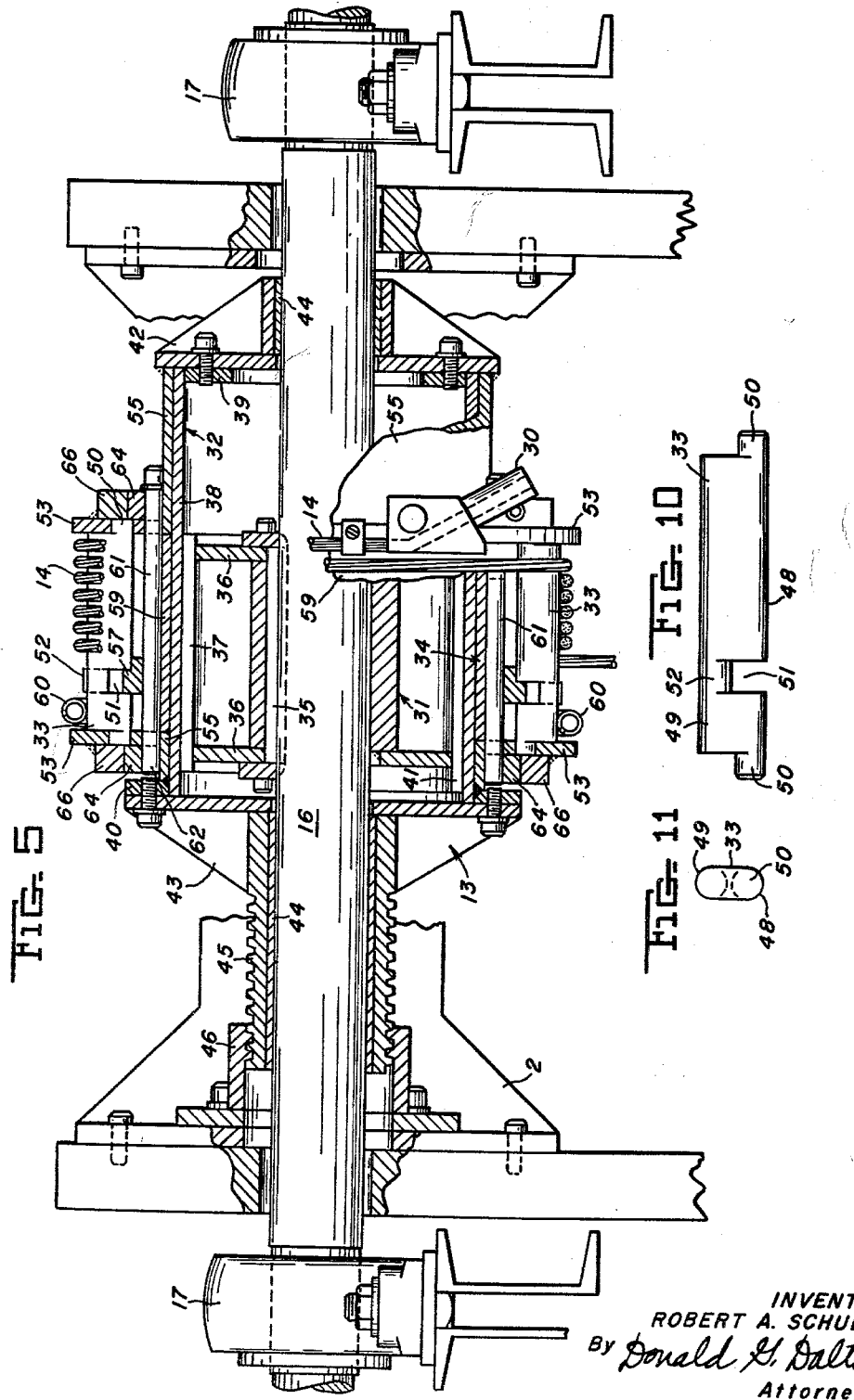

March 2, 1965 R. A. SCHULTZ 3,171,611
CABLE REEL
Original Filed Sept. 1, 1959 4 Sheets-Sheet 3
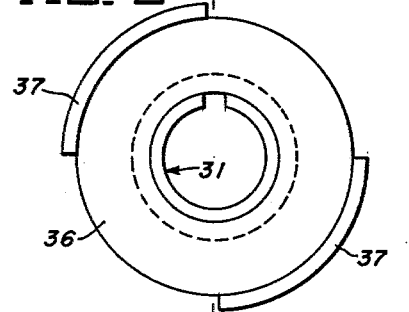
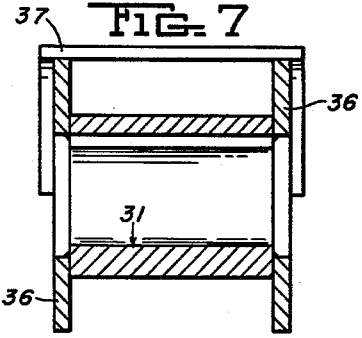
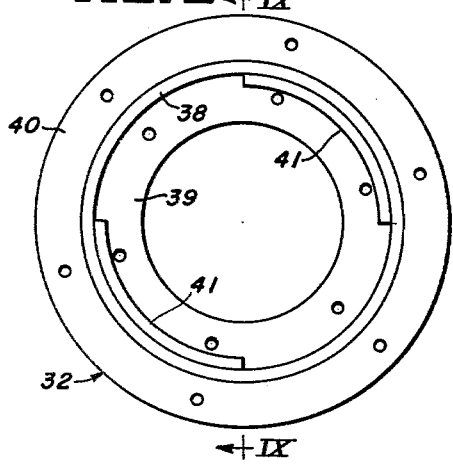
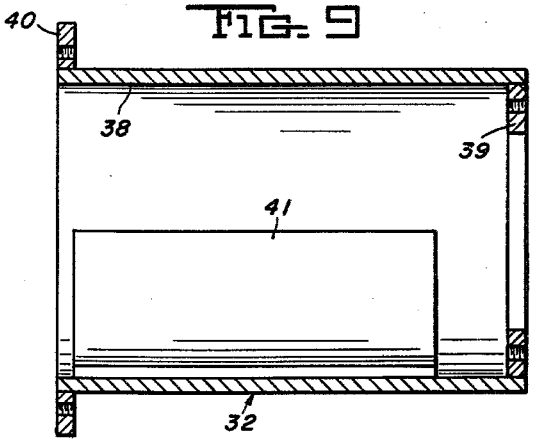
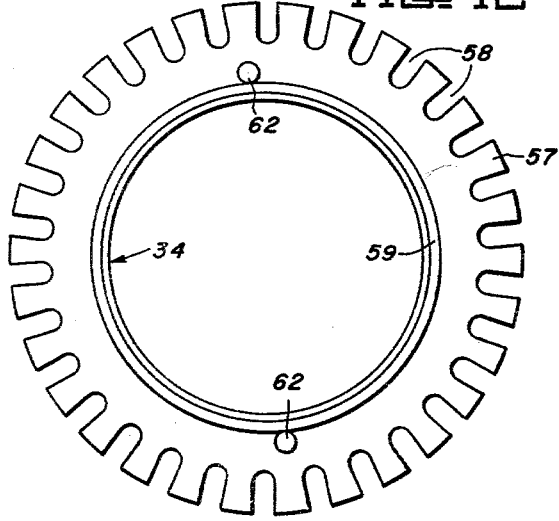
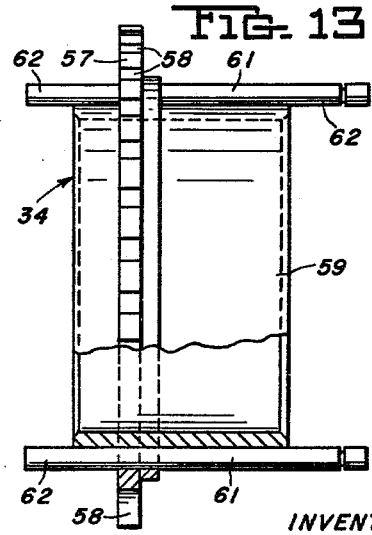
INVENTOR
ROBERT A. SCHULTZ
By Donald G. Dalton
Attorney

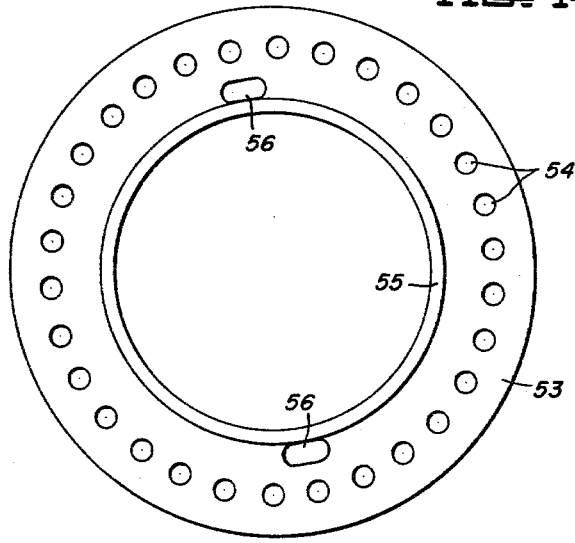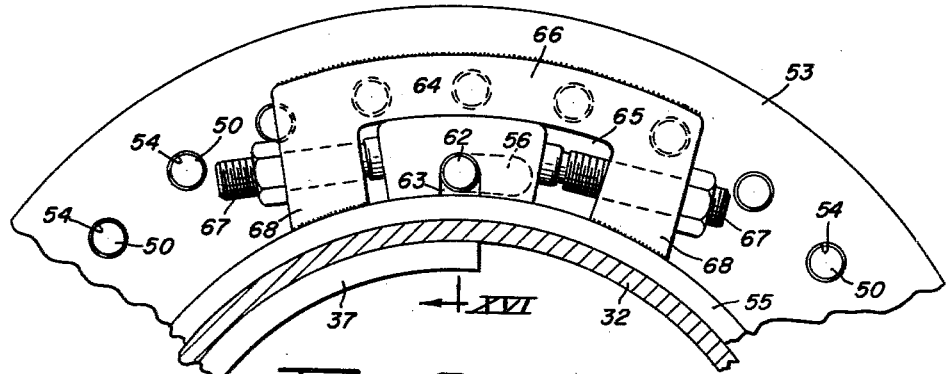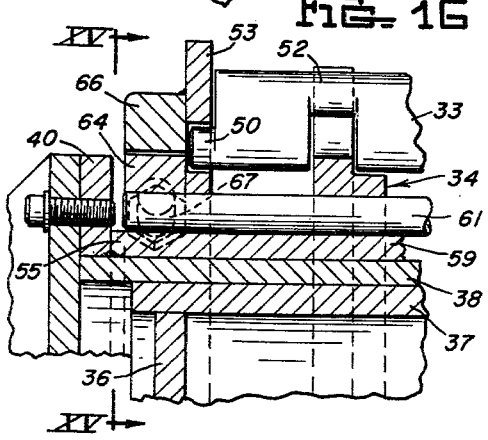

United States Patent Office 3,171,611
Patented Mar. 2, 1965

3,171,611
CABLE REEL
Robert A. Schultz, Pittsburgh, Pa., assignor to United States Steel Corporation, a corporation of New Jersey
Original application Sept. 1, 1959, Ser. No. 837,418, now Patent No. 3,075,420, dated Jan. 29, 1963. Divided and this application May 28, 1962, Ser. No. 198,152
3 Claims. (Cl. 242—110.1)

This application is a division of my co-pending application Serial No. 837,418, filed September 1, 1959, now Patent No. 3,075,420 and the invention, as indicated, relates to a reel for cables and the like.

As further indicated in my above mentioned patent, the reel of this invention is especially adapted for use in apparatus for punching samples from continuously travelling metal strip of the type, for example, shown in the co-pending application of Alfred Teplitz, Serial No. 827,287, filed July 15, 1959, now Patent No. 3,075,421, in that it incorporates improvements that are directed to the end of synchronizing the movement of a punch frame with respect to travelling strip from which a sample is to be removed.

One of the principal objects of this invention is to provide a reel of improved construction that enables an accurate adjustment of its cable winding diameter. A related object is to provide a reel comprised of circumferentially spaced parallel bars which furnish a reel support for the cable and which are adjustably supported for movement in a radial direction to vary the winding diameter of the reel.

Another object is to provide a reel in which the free portion of a cable being reeled or unreeled with respect thereto is constrained to movement along an unchanging linear and vertical path that extends tangentially relative to its periphery. To this end the reel is mounted for axial traversing movement and has a traversing drive for moving it axially in response to rotation thereof in such manner that the cable is wound or unwound relative thereto with a threading action. In this manner the angle of the cable relative to the reel, which continuously changes in conventional reversing reels, is maintained constant to thereby eliminate variation in cable speed as well as wear on the cable that normally takes place in conventional apparatus as the result of change in the angular position of the cable.

Other objects and advantages of the invention will become apparent from the following description.

The accompanying drawings show a preferred embodiment of the reel of this invention and the manner in which it forms a part of a strip sampling apparatus of the character mentioned generally above. In this showing:

FIGURE 1 is an elevational view of a strip sampling apparatus for which the cable reel of this invention is especially adapted;

FIGURE 2 is a fragmentary elevational view looking from the right of FIGURE 1 with the punch frame thereof shown in an elevated position and in which the reel of this invention is shown diagrammatically;

FIGURE 3 is a fragmentary vertical sectional view showing somewhat diagrammatically an over-running clutch that forms part of the drive for controlling rotation of the reel shown in FIGURE 2;

FIGURE 4 is a fragmentary sectional view taken substantially in the plane of the line IV—IV of FIGURE 3;

FIGURE 5 is a diametral sectional view of the reel of this invention in which fragmentary parts thereof are shown in elevation;

FIGURE 6 is an end elevational view of the central or inner hub of the reel shown in FIGURE 5; and FIGURE 7 is a sectional view taken along the line VII—VII thereof;

FIGURE 8 is an end elevational view of the outer hub of the reel shown in FIGURE 5; and FIGURE 9 is a sectional view taken along the line IX—IX thereof;

FIGURES 10 and 11 are respectively side and end elevational views of one of the bars that form a reeling support for the cable;

FIGURE 12 is an end elevational view of the adjusting ring that controls the angular position of the reeling bars; and FIGURE 13 is a side elevation thereof in which a fragmentary part is broken away and shown in section;

FIGURE 14 is an end elevation of one of the mounting rings for the bars of the cable reeling supoprt;

FIGURE 15 is an enlarged and fragmentary end elevational view showing the mechanism for adjusting the angular position of the adjusting ring shown in FIGURES 12 and 13; and FIGURE 16 is a sectional view taken along the line XVI—XVI of FIGURE 15.

The strip punching apparatus shown somewhat diagrammatically in FIGURES 1 and 2, as indicated above, is covered by the above mentioned Teplitz patent to which reference is made for a more detailed description thereof. It comprises, generally stated, a punch-frame assembly 1, which is mounted for vertical movement with respect to a frame 2, a hoist unit 3 that controls the raising and lowering movements of the assembly 1, and a pair of camming units 4 (only one of which is shown in FIGURE 1) respectively arranged in the path of vertical movement of opposite ends of the assembly 1, for operating it to effect a strip punching operation. The strip S travels continuously over guide rolls 5, 6 and 7 and moves downwardly over a vertical path between the guide rolls 6 and 7 that extends through the punch-frame assembly 1. To effect a strip punching operation, the hoist unit 3 is operated to elevate the punch-frame assembly 1 from its lowered position shown in FIGURE 1 to its elevated position shown in FIGURE 2, where it is released for gravitational downward movement in the direction of strip travel between the guide rolls 6 and 7. As the assembly moves downwardly, the camming units 4 operate punch and die devices 8 and 9, which are respectively positioned on opposite sides of the strip S, to effect a strip punching operation. The assembly 1 comprises a carriage in the form of a rectangular frame 10 which has its vertical movement guided by rods 11 that are fastened to standards 12 extending vertically along opposite edges of the strip S as best shown in FIGURE 2. The camming units 4 referred to above are secured in facing relation along the inner sides of the standards 12.

As indicated above raising and lowering movement of the assembly 1 is controlled by the hoist unit 3, which includes the winding drum or reel 13 (shown diagrammatically in FIGURE 2) of this invention and a hoist cable 14 that has its lower end 15 connected to the frame 10 and its other end anchored and wound on the reel 13. The drum 13 is mounted for rotation with a shaft 16 which is supported in bearings 17 and is driven by an electric hoist motor 18 through a chain and sprocket drive 19. Upon operation of the motor 18, the drum 13 is rotated to wind the cable thereon and raise the assembly 1 to the elevated position shown in FIGURE 2. As the assembly moves into this position, a limit switch 20, which controls rotation of the drum 13 by the shaft 16, is actuated to discontinue the upward movement of the assembly 1 and release it for gravitational movement downwardly over the guide rods 11. While the drum 13 in the preferred construction of the unit 3 is connected and released with respect to the motor sprocket drive 18–19 through magnetic clutches (not shown), the drive shaft 16 can be regarded for the purpose of this invention as being driven directly by the sprocket drive 18–19 such that raising and lowering of the assembly 1 is controlled by the energized condition of the motor 18. In this respect, it will be understood that the limit switch 20 can be regarded as controlling the energization of the motor 18 and, more particularly, as operating to de-energize it and to release the drum 13 for a gravitational lowering movement of the assembly 1.

In order that the strip will not be torn or mutilated when the punching operation is effected, the assembly 1 must have a downward speed, when it is opposite the camming units 4 and a strip punching operation of the punch and die devices 8 and 9 is effected thereby, that exactly matches the speed of travel of the strip S. Synchronization of the speed of the downward movement of the assembly 1 and the strip S is essential in order that there will be no relative vertical movement between the strip and the punch and die parts 8–9 when they are operated to punch a sample from the strip S. The speed synchronization for this purpose is, according to the invention covered by my co-pending application, Serial No. 829,379, filed July 24, 1959, now Patent No. 3,075,419, preferably accomplished through a drive that includes an over-running clutch 21 which forms part of the hoist unit 3. The clutch 21 is conventional and is shown diagrammatically in FIGURES 3 and 4 of the drawings as comprising an inner race 22 connected by a key 23 to the shaft 16, and an outer race 24 supported for rotation on the outer end 25 of the shaft 16. The outer race 24 is rotated continuously in a counterclockwise direction as viewed in FIGURE 4 by a chain and sprocket drive which includes a sprocket 26 keyed to the outer race 24, a sprocket 27 (see FIGURE 2) connected with the strip guide roll 6 for rotation therewith, and a sprocket chain 28 connecting the sprockets 26 and 27. Since the guide roll 6 has frictional engagement with the strip S and is thus driven at a speed corresponding to the linear speed of strip movement, the outer race 24 is continuously driven at a rotational speed corresponding to the linear speed of strip travel. The over-running feature of the clutch 21 is provided by clutch wedges or sprags 29 between the inner race 22 and the outer race 24 which operate to prevent rotation of the inner race 22 in a counterclockwise direction, as viewed in FIGURE 4, at a rotational speed greater than the rotational speed of the outer race 24. In this manner, the overrunning clutch 21 provides for unrestricted relative rotation of the inner race 22 and shaft 16 in a clockwise direction as viewed in FIGURE 4, to permit elevation of the frame assembly 1, and to permit its downward acceleration by gravity to a speed corresponding to the speed of strip travel. When the clutch sprags 29 operate to lock the inner race 22 to the outer race 24, further increase in the speed of downward movement of the assembly 1 by gravitational acceleration is prevented, and this action takes place when the assembly 1 reaches the speed at which the strip S is travelling.

From the foregoing it will be apparent that the synchronizing drive acting through the over-running clutch 21 operates to synchronize the downward movement of the assembly 1 with the strip S, and that this is accomplished at different speeds of strip travel. In this respect, it will be noted that for slow speeds of strip movement the sprags 29 operate to lock the inner and outer races 22 and 24 against relative movement at an early point in the downward movement of the assembly 1, while for higher strip speeds the sprags 29 operate at a later point in the downward movement of the assembly 1. The speed synchronizing action of the clutch 21 enables a stationary location of the limit switch 20 so that the punch-frame assembly 1 is released for downward movement at a fixed elevation for all speeds of strip travel, and the limit switch 20 may thus be attached to one of the standards 12 in the fixed position shown in FIGURE 2.

FIGURES 5 through 16 show the preferred construction of the reel 13 of this invention. A connection 30 at the right of the reel 13 as viewed in FIGURE 5 anchors the cable 14 thereto. The reel comprises, generally stated, an inner hub 31 (FIGURES 6 and 7), an outer hub 32 (FIGURES 8 and 9), a plurality of tumblers or eccentric bars 33 (FIGURES 10 and 11) that are arranged in circumferentially spaced and parallel positions about the axis of the shaft 16 and cooperate to furnish a reeling support for the cable 14, and a ring assembly 34 (FIGURES 12 and 13) for adjusting the angular position of the eccentric bars 33 to vary the effective cable winding diameter of the reel 13. In a manner to be described, the outer hub 32 and the bars 33 thereon are moved axially in response to rotation of the reel 13 to provide for winding and unwinding of the cable 14 thereon with a threading action.

The inner hub 31 is connected by a key 35 (FIGURE 5) to the shaft 16 for rotation therewith. Annular plates 36 at opposite ends of the hub 31 furnish a support for a pair of cylindrical quadrants 37 which have welded connections therewith. The quadrants 37 comprise quarter-sections or segments of a cylindrical pipe and are mounted on the end plates 36 in diametrically opposed positions displaced 90° relative to each other as best shown in FIGURE 6.

The outer hub 32 as shown in FIGURES 8 and 9 comprises a cylindrical sleeve 38 which has inturned and outturned mounting flanges 39 and 40 at opposite ends thereof. A pair of cylindrical quadrants 41, in the form of quarter pipe sections or segments, are secured to the internal surface of the sleeve 38 in diametrically opposed positions displace 90° relative to each other. When the outer hub 32 is assembled concentrically on the inner hub 31 as shown in FIGURE 5, the inner hub quadrants 37 have meshing engagement with the outer hub quadrants 41, which thus operate to transmit rotary movement between the inner and outer hubs 31 and 32. In addition, the meshing engagement of the quadrants 37 and 41 provides for axial movement of the outer hub 32 with respect to the inner hub 31, which is secured against axial movement on the shaft 16.

The outer hub 32 is supported for axial movement on the shaft 16 by an end collar 42 which has a bolted connection (FIGURE 5) with the inturned flange 39 and an end collar 43 which has a bolted connected with the outturned flange 40. Each of the collars 42 and 43 has a central bushing 44 that supports it for axial sliding movement on the shaft 16. An extension 45 on the collar 43 has threaded engagement in a stationary nut 46, which is connected to the stationary framework 2 of the apparatus and held thereby against rotation. The threaded extension 45 and nut 46 provide a traverse drive which is effective upon rotation of the reel in response to a cable winding or unwinding operation to impart axial movement to the outer hub 32 so that the reeling movement of the cable 14 on the supporting bars 33 is effected with a threading action. By reason of the axial traversing movement imparted to the reel in the manner, the portion 47 of the cable 14 between its punch carriage connection 15 and the reel 13 (see FIGURE 2) is maintained in a vertical position tangential to the reel 13 as shown in FIGURE 2 and its reeling and unreeling movement takes place over a rectilinear path extending vertically upwardly from its frame connection 15. Since the angle of the cable portion 47 relative to the reel 13 never changes, it will be apparent that winding and unwinding of the cable on the reel 13 will not affect the speed of movement of the punch frame carriage 10 which will thus move at a linear speed which is directly proportional to the angular velocity of the reel 13. The pitch of the threads on the extension 45 and nut 46 is preferably slightly greater than the diameter of the cable 14 to prevent side wear on the cable 14 as it is wound and unwound on the reel 13.

As shown in FIGURES 10 and 11, each of the tumblers 33 is a flat bar having a rounded inner edge 48 and a rounded outer edge 49 that furnishes a reeling support for the cable 14. Trunnions 50 project from opposite ends of the bar 33 with their axis adjacent the inner edge 48 and thus eccentrically located with respect to the cable-reeling outer edge 49 for a purpose to be described. A notch 51 extends inwardly from the inner edge 48 at a point intermediate the ends of the bar, and the bar portion 52 at the inner end of the notch 51 has a cylndrical contour to provide for rotational adjustment of the angular position of the bar 33 in a manner to be described.

The bars 33 are pivotally supported on the outer hub 32 by a pair of axially spaced flanges 53 that, as shown in FIGURE 14, have a plurality of pivot openings 54 in a number corresponding to the number of bars 33 and in which the bar trunnions 50 are pivotally received. The flanges 53 are secured to the hub 32 by cylindrical skirts 55 of unequal axial length along their inner edges that are fitted on the outer surface of the hub 32 and are rigidly secured as by welding against rotational movement relative thereto. Radially inwardly of the pivot openings 54, each flange 53 has a pair of diametrically opposed arcuate slots 56 for a purpose to be described.

The ring assembly 34 for adjusting the angular position of the bars 33, as shown in FIGURES 12 and 13, comprises a flange 57 that has a plurality of circumferentially spaced slots 58 extending inwardly from its periphery in which the cylindrical bar portions 52 have a loose fit when the ring assembly 34 is mounted on the outer hub 32 as shown in FIGURE 5. The flange 57 is welded along its inner edge to a cylindrical collar 59 that, in the assembled position shown in FIGURE 5, is rotatably supported on the outer surface of the hub 32 in a position between the flange skirts 55, which operate to hold it against axial movement relative to the hub 32. In this position, the flange 57 is arranged in an axial position opposite the bar notches 51 and the cylindrical bar portions 52 are received in the flange notches 58. Upon rotation of the ring assembly 34 relative to the hub 32, the bars 33 are rotated about the axes of their respective mounting trunnions 50, and this rotational movement adjusts the radial position of the bar outer edges 49 with reference to the axis of the hubs 31 and 32 to thereby adjust the effective cable winding diameter of the reel 13. A cylindrical garter spring 60 is applied about the bars 33 to hold them in position after the cable 14 is unwound from the reel.

Adjustment of the angular position of the ring assembly 34 on the hub 32 is effected by a pair of rods 61 that are secured to the outer surface of the mounting collar 59 in positions extending axially thereof and with their opposite ends projecting through the arcuate slots 56 in the bar mounting flanges 53. Since the bar mounting flanges 53 are secured against movement of the outer hub 32, the maximum angular adjustment of the ring assembly 34 thereon is determined by the arcuate length of the slots 56. As shown in FIGURES 15 and 16, each end 62 of the rods 61 is received with a snug fit in an opening 63 in an adjusting block 64 that is mounted for limited arcuate movement over the external surface of one of the flange mounting skirts 55, and is received in an arcuate shaped opening 65 in a U-shaped guide block 66 welded in an inverted position to the flange 55. The position of the block 64 in the opening 65 is controlled by adjusting screws 67 that have threaded engagement in the legs 68 of the guide block 66. Adjustment of the position of the blocks 64 in the openings 65 adjusts the positions of the rod ends 62 in the arcuate slots 56 in the bar mounting flanges 53, and thereby the angular position of the ring assembly 34 on the outer hub 32. FIGURES 5 and 15 show the relative parts of the ring assembly 34 in the position in which the outer edges 49 of the bars 33 provide a cable winding reel of maximum diameter. When the relative positions of the rod ends 62 are moved to the right in the slot 56 as viewed in FIGURE 15, the ring assembly 34 operates to rotate the bars 33 in a direction which moves their outer edges 49 inwardly relative to the adjusting ring slots 58 and to thereby decrease the effective winding diameter of the reel 13.

With reference to the strip punching apparatus shown in FIGURES 1 and 2 of the drawings, it will be recalled that the chain and sprocket drive 26–28 operates through the over-running clutch 21 to prevent further acceleration of the speed of downward movement of the punch frame 10 when the reel 13 and guide roller 6 are rotating at the same angular velocity. In order that the downward movement of the frame 10 will be synchronized with the speed of strip travel at this point, it is essential that the peripheral speeds of the roll 6 and reel 13 be synchronized at this time. It will thus be apparent that adjustment of the effective winding diameter of the reel 13 that is provided by angular adjustment of the eccentrically mounted bars 33 enables acurate synchronization of the movement of the frame 10 with respect to the strip S. In addition, it will be apparent that the axial movement of the reel 13 that is provided by the threaded extension 45 and the nut 46 eliminates speed variations due to changing cable angles and thus contributes to accurate synchronization of the speed of downward movement of the frame 10 and travel of the strip S.

The combination of the reel of this invention in a strip punching apparatus of the type shown in FIGURES 1 and 2 is covered by the claims of my said co-pending application to which reference is hereby made. This invention comprises the structure of the reel 3 and adaptations or modifications thereof within the scope of the following claims.

I claim:

1. A reel for cables and the like comprising a rotatable hub, a pair of axially spaced end flanges secured to said hub for rotation therewith, said flanges respectively having a plurality of circumferentially spaced openings therein arranged in axially aligned pairs relative to each other, a plurality of bars respectively having pivot pins at the ends thereof rotatably supported in one of said pairs of flange openings, said bar pivot pins being eccentrically located with respect to said bars whereby rotation of each of said bars about the axis of its said pivot pins operates to adjust the position of its outer edge in a radial direction relative to the axis of said hub, said bar outer edges cooperating to provide a reel support for a cable on said hub, an adjusting ring rotatably supported on said hub in an axial position between said end flanges, said ring having a plurality of circumferentially spaced and outwardly opening notches and each of said bars having a portion of circular cross-section eccentrically located with respect to the pivot pins at the ends thereof received in one of said notches, and means for adjusting the rotational position of said ring on said hub to thereby rotate said bars simultaneously and adjust the radial positions of their said outer edges comprising an adjusting bar secured to said ring and projecting in opposite directions therefrom, each of said end flanges having an arcuate slot through which one end of said adjusting bar projects, and means for adjusting the respective positions of said bar ends in said arcuate slots.

2. A cable reel comprising a rotatable shaft, an inner hub secured to said shaft for rotation therewith, an outer hub mounted concentrically with respect to said inner hub, connecting means between said hubs providing for rotation of said outer hub by said inner hub and for axial movement of said outer hub relative to said shaft and inner hub, a pair of axially spaced end flanges secured to said outer hub for rotation therewith, said flanges respectively having a plurality of circumferentially spaced openings therein arranged in axially aligned pairs relative to each other, a plurality of bars respectively having pivot pins at the ends thereof rotatably supported in one of said pairs of flange openings, said bar pivot pins being eccentrically located with respect to said bars whereby rotation of each of said bars about the axis of its said pivot pins operates to adjust the position of its outer edge in a radial direction relative to the axis of said outer hub, said bar outer edges cooperating to provide a reel support for a cable on said outer hub, means for simultaneously adjusting the rotational position of said bars on said outer hub to thereby adjust the effective diameter of said reel support, and means for moving said outer hub axially in response to rotation thereof by said connecting means to maintain the path of cable reeling and unreeling movement along a predetermined path relative thereto.

3. A reel as defined in claim 2 characterized by said last named means comprising a threaded axial extension on said outer hub and arranged concentrically of said shaft, and a stationary nut having threaded engagement with said extension, the threads on said nut and extension having a pitch slightly greater than the thickness of the cable on said reel support.

References Cited in the file of this patent
UNITED STATES PATENTS

| | | |
|---|---|---|
| 934,964 | Ethridge | Sept. 21, 1909 |
| 1,428,119 | Rogers | Sept. 5, 1922 |
| 1,433,252 | Barber | Oct. 24, 1922 |
| 2,457,786 | Slayter | Dec. 28, 1948 |
| 2,568,088 | Pedersen | Sept. 18, 1951 |
| 2,594,484 | Nixon | Apr. 29, 1952 |
| 2,628,040 | Rayburn | Feb. 10, 1953 |
| 2,659,573 | Smith | Nov. 17, 1953 |
| 3,007,652 | Heckman | Nov. 7, 1961 |

FOREIGN PATENTS

| | | |
|---|---|---|
| 925,709 | Germany | Mar. 28, 1955 |